(12) United States Patent
Okuda et al.

(10) Patent No.: US 8,140,125 B2
(45) Date of Patent: Mar. 20, 2012

(54) MOBILE COMMUNICATION TERMINAL

(75) Inventors: Kei Okuda, Higashihiroshima (JP);
Naoto Satokata, Higashihiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 753 days.

(21) Appl. No.: 12/294,415

(22) PCT Filed: Mar. 9, 2007

(86) PCT No.: PCT/JP2007/054728
§ 371 (c)(1),
(2), (4) Date: Sep. 24, 2008

(87) PCT Pub. No.: WO2007/111112
PCT Pub. Date: Oct. 4, 2007

(65) Prior Publication Data
US 2009/0170565 A1 Jul. 2, 2009

(30) Foreign Application Priority Data
Mar. 28, 2006 (JP) ................................. 2006-087357

(51) Int. Cl.
*H04B 1/38* (2006.01)
(52) U.S. Cl. .................. 455/566; 455/550.1; 455/556.2; 345/168; 345/169
(58) Field of Classification Search .................. 455/566, 455/550.1, 556.2, 90.3; 345/659, 168, 169
See application file for complete search history.

(56) References Cited

U.S. PATENT DOCUMENTS
| | | | | |
|---|---|---|---|---|
| 6,393,307 B1 * | 5/2002 | Kim | ............................... | 455/566 |
| 6,697,083 B1 * | 2/2004 | Yoon | ............................... | 345/659 |
| 7,174,195 B2 * | 2/2007 | Nagamine | ................... | 455/575.1 |
| 7,200,423 B2 * | 4/2007 | Bum | ............................... | 455/566 |
| 7,339,600 B2 * | 3/2008 | Hwang | ........................... | 345/659 |

(Continued)

FOREIGN PATENT DOCUMENTS
JP 3-250360 A 11/1991
(Continued)

OTHER PUBLICATIONS

FOMA P901iTV Toriatsukai Setsumeisho, First Edition, NTT DoCoMo Group, Mar. 2006, pp. 28, 30, 316, 320.

(Continued)

*Primary Examiner* — Olumide T Ajibade Akonai
(74) *Attorney, Agent, or Firm* — Birch, Stewart, Kolasch & Birch, LLP

(57) ABSTRACT

There is provided a mobile communication terminal of which a display area is inhibited from narrowing when a state of a display screen is switched from a vertically long state to a horizontally long state.

The mobile communication terminal is configured to include: a connecting state detecting part 18 adapted to determine whether a display screen 2a is in the vertically long state or the horizontally long state; a display object storage part 20 adapted to store first and second display objects to be displayed depending on an operating state; and a display controlling part 16 adapted to display the respective display objects on the display screen 2a. The display controlling part 16 displays, in the case where the display screen 2a is in the vertically long state, a plurality of the first objects in a first object display area provided in an upper end portion of the display screen, and a plurality of the second display objects in a second object display area provided in an lower end portion of the display screen, or in the case where the display screen is in the horizontally long state, the respective first and second display objects in a third object display area provided in any of an upper end portion or a lower end portion of the display screen.

8 Claims, 9 Drawing Sheets

U.S. PATENT DOCUMENTS

| | | | |
|---|---|---|---|
| 2003/0064758 A1* | 4/2003 | Mizuta et al. | 455/566 |
| 2003/0177501 A1 | 9/2003 | Takahashi et al. | |
| 2003/0223576 A1* | 12/2003 | Totani | 379/433.04 |
| 2005/0070327 A1* | 3/2005 | Watanabe | 455/552.1 |
| 2005/0091431 A1* | 4/2005 | Olodort et al. | 710/72 |
| 2005/0190281 A1 | 9/2005 | Lee et al. | |
| 2007/0044028 A1* | 2/2007 | Dunn et al. | 715/761 |
| 2007/0049255 A1* | 3/2007 | Bhakta et al. | 455/412.2 |

FOREIGN PATENT DOCUMENTS

| | | |
|---|---|---|
| JP | 10-26964 A | 1/1998 |
| JP | 10-49334 A | 2/1998 |
| JP | 2004-135360 A | 4/2004 |
| JP | 2005-159507 A | 6/2005 |
| JP | 2005-241652 A | 9/2005 |
| JP | 2005-318164 A | 11/2005 |

OTHER PUBLICATIONS

Partial translation for JP-2005-318164-A (Nov. 10, 2005).
Partial translation for JP-2005-159507-A (Jun. 16, 2005).
Partial translation for NPL Document "FOMA P901iTV Toriatsukai Setsumeisho".
Concise explanation for JP-2004-135360-A (Apr. 30, 2004).

* cited by examiner

[Fig. 1]
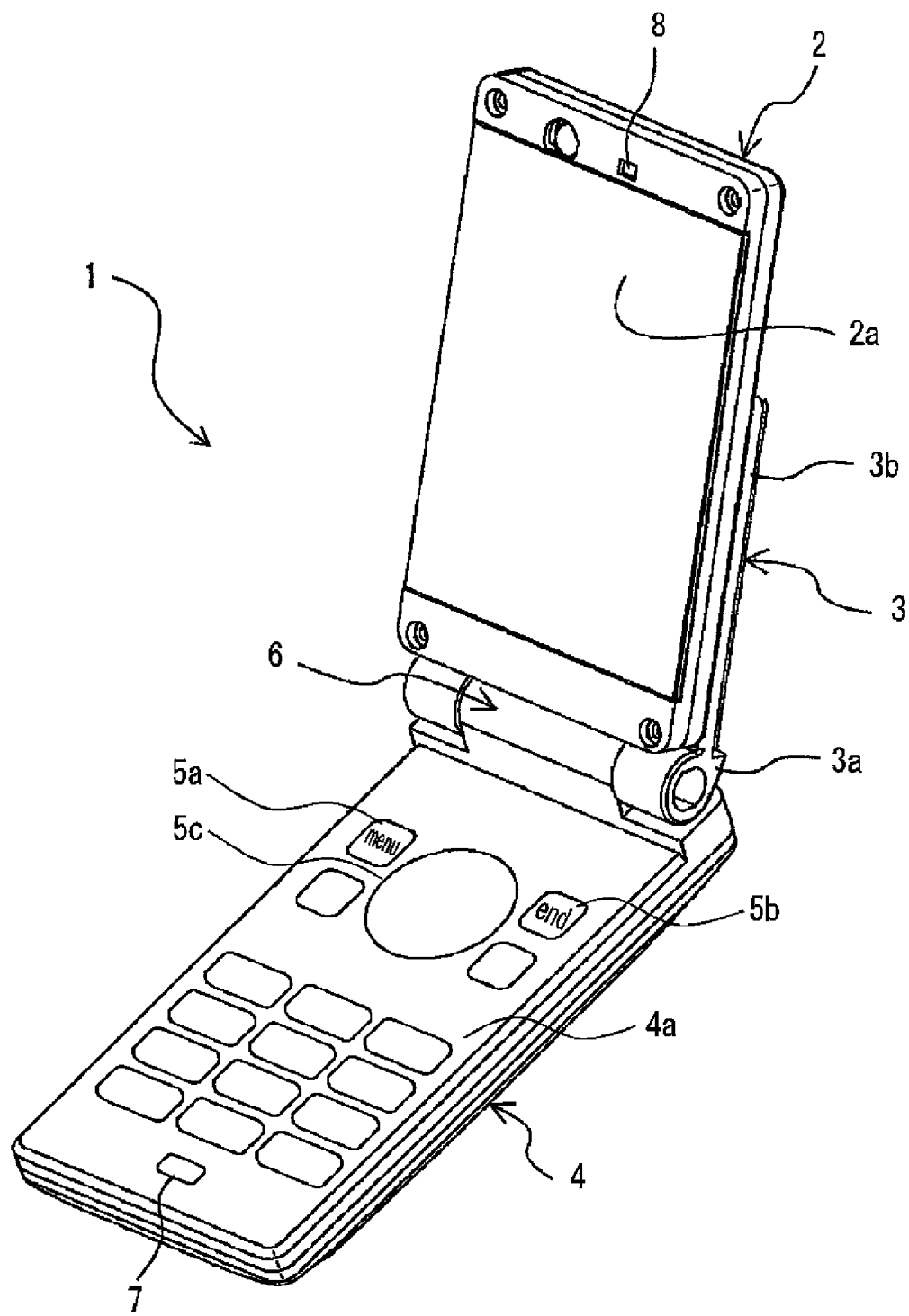

[Fig. 2]
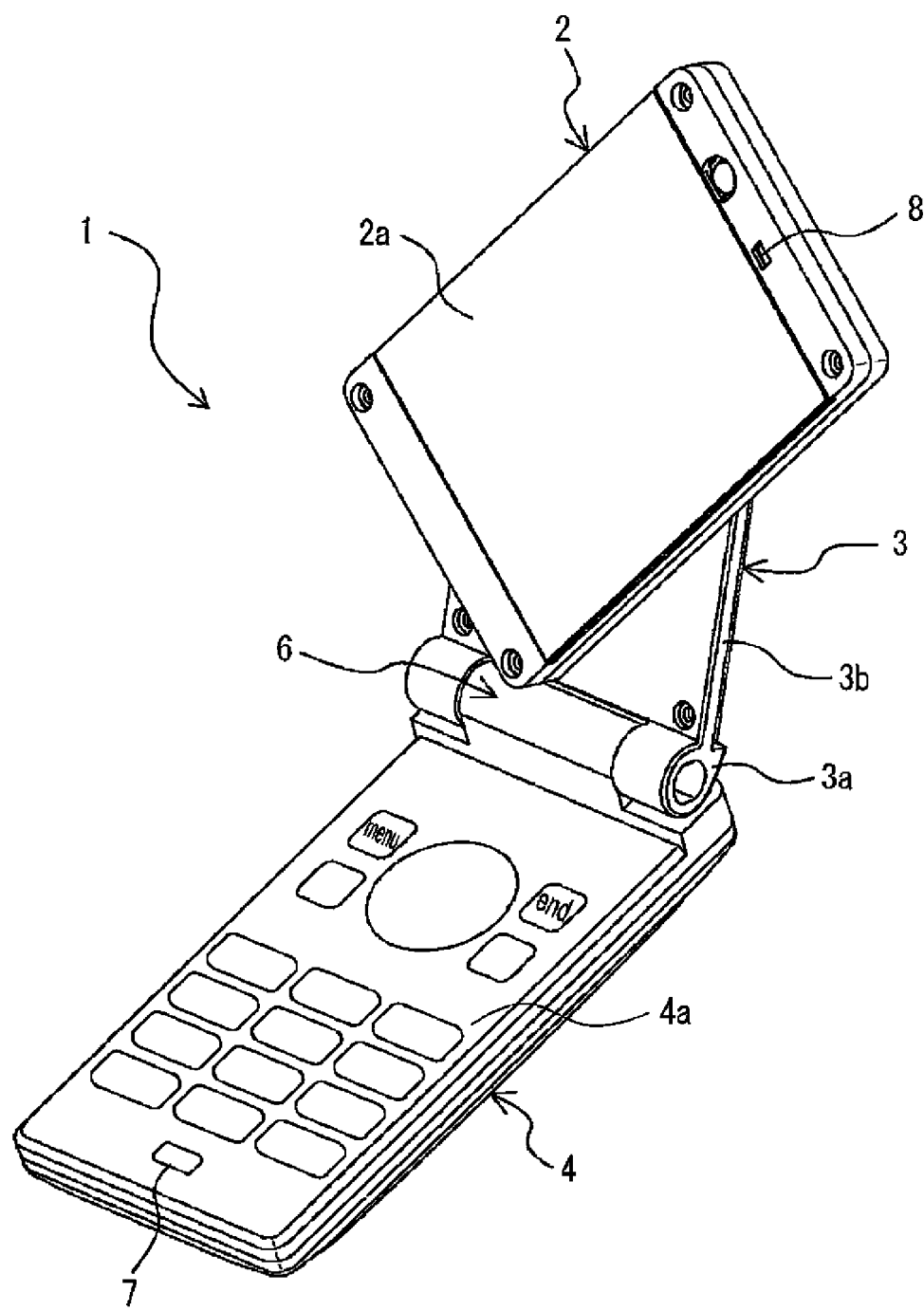

[Fig. 3]
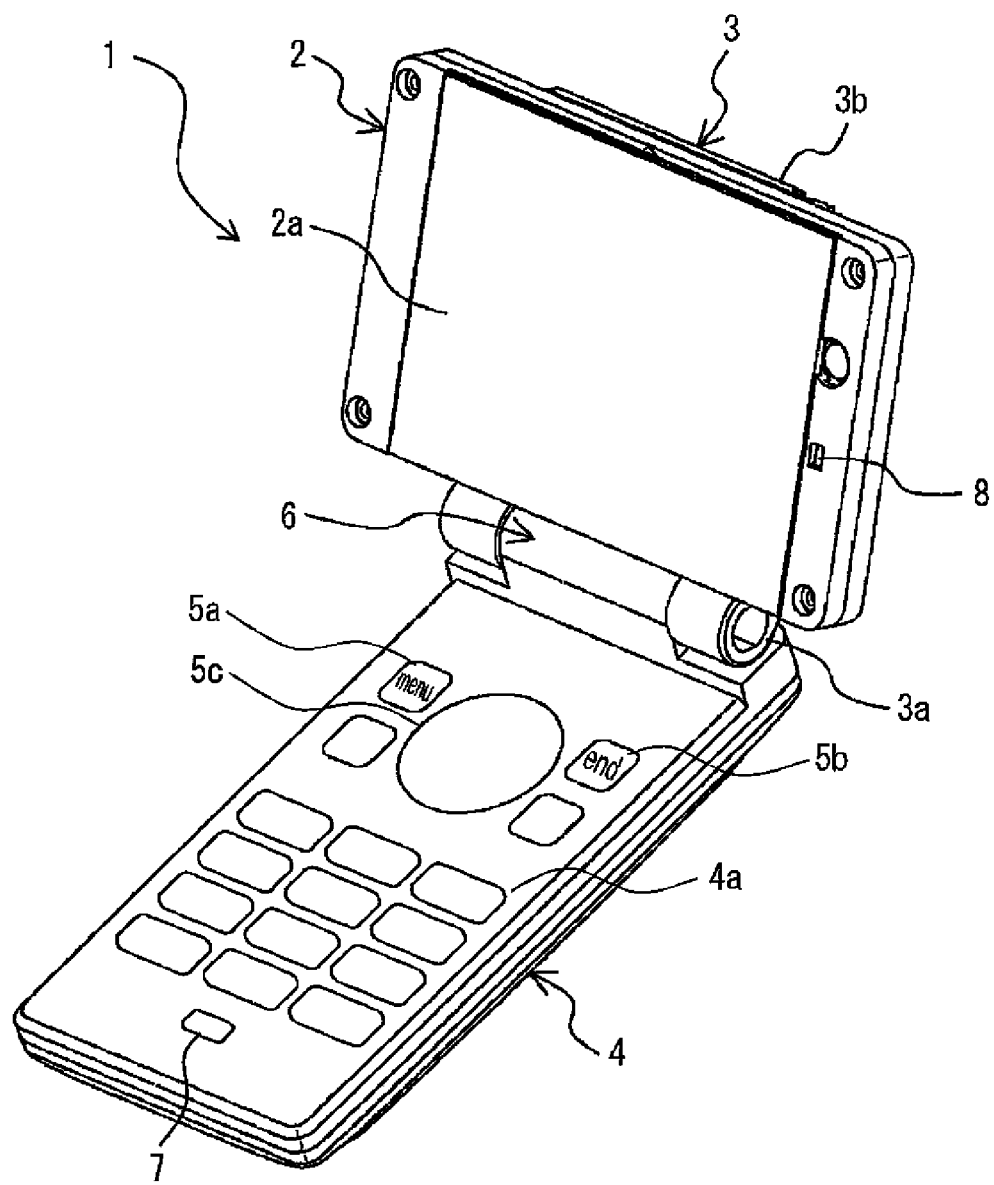

[Fig. 4]
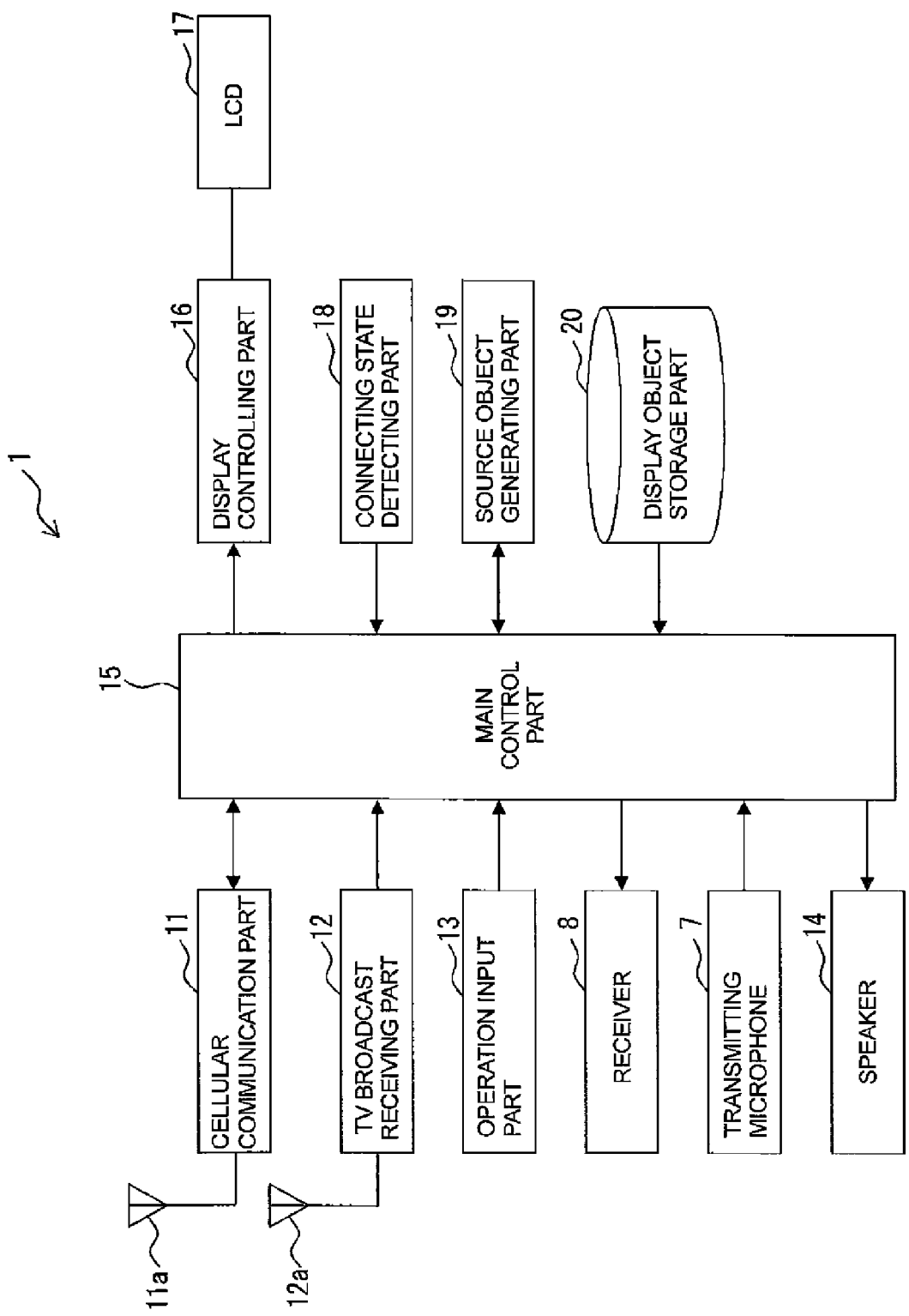

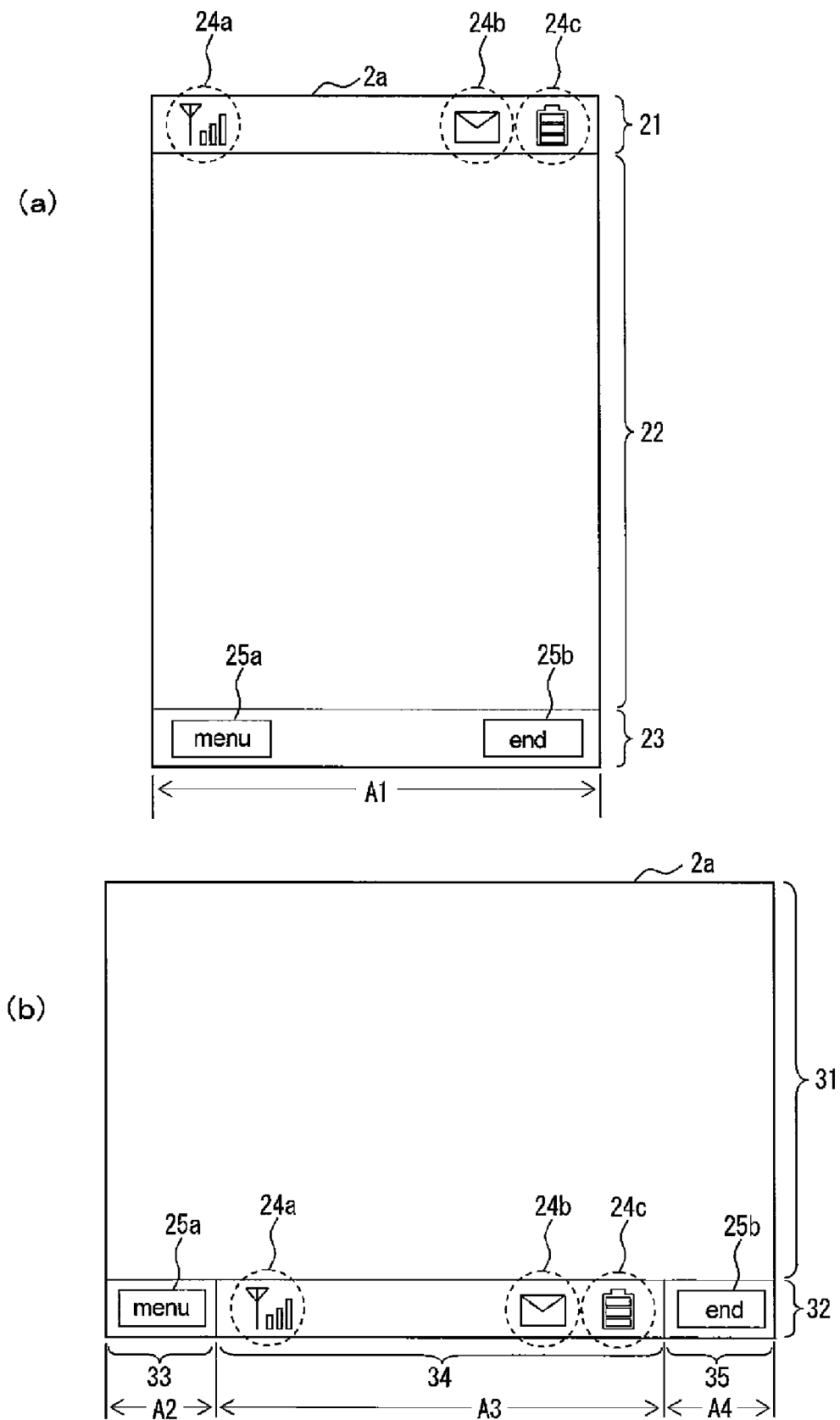
[Fig. 5]

【Fig. 6】
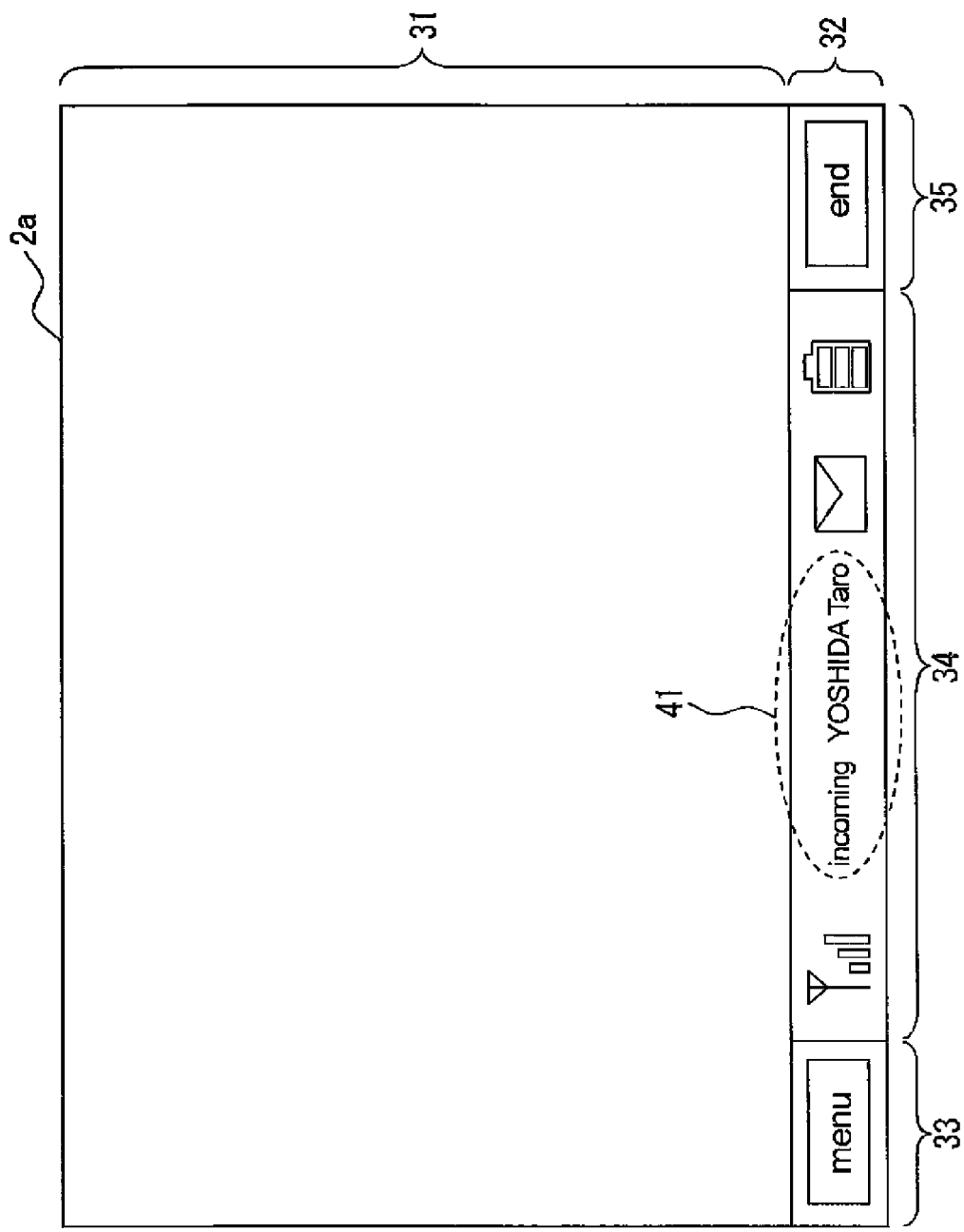

[Fig. 7]
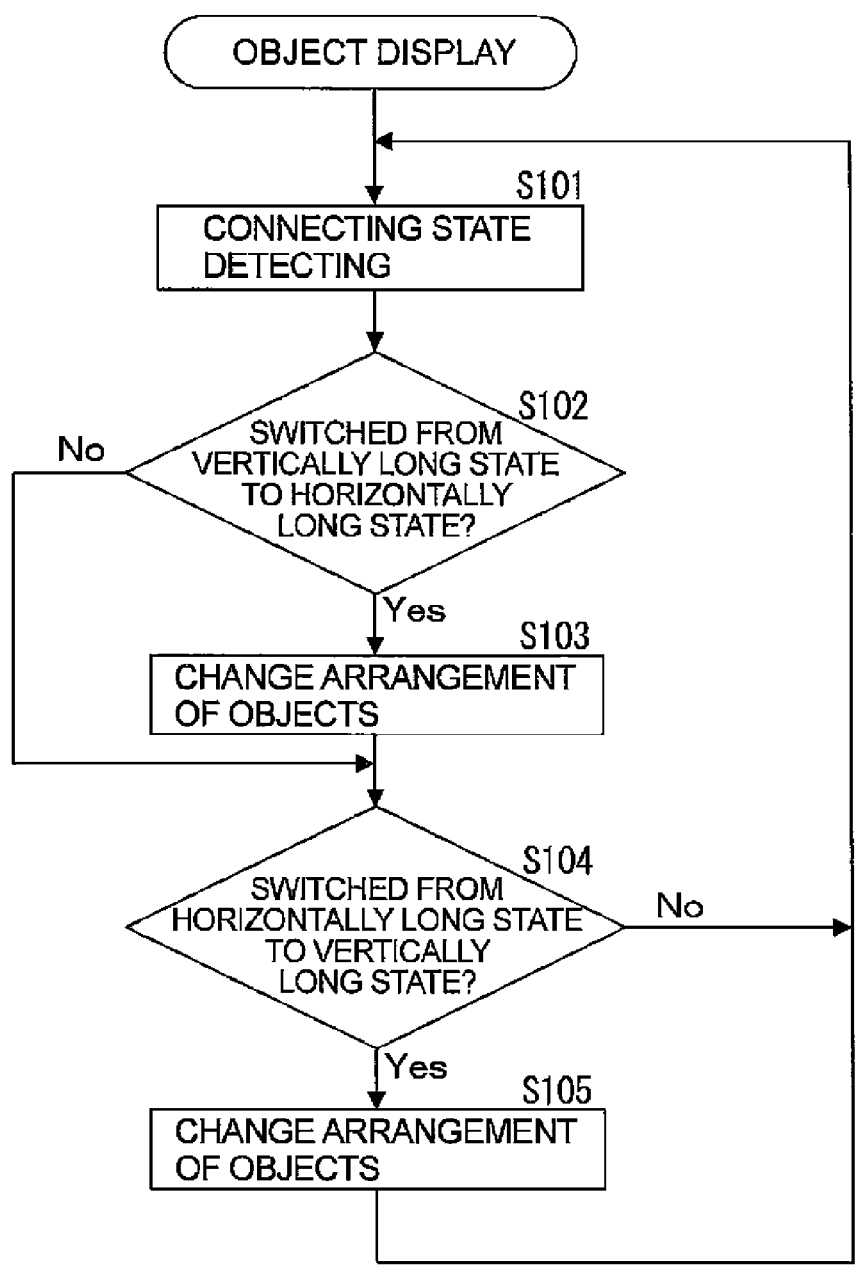

【Fig. 8】
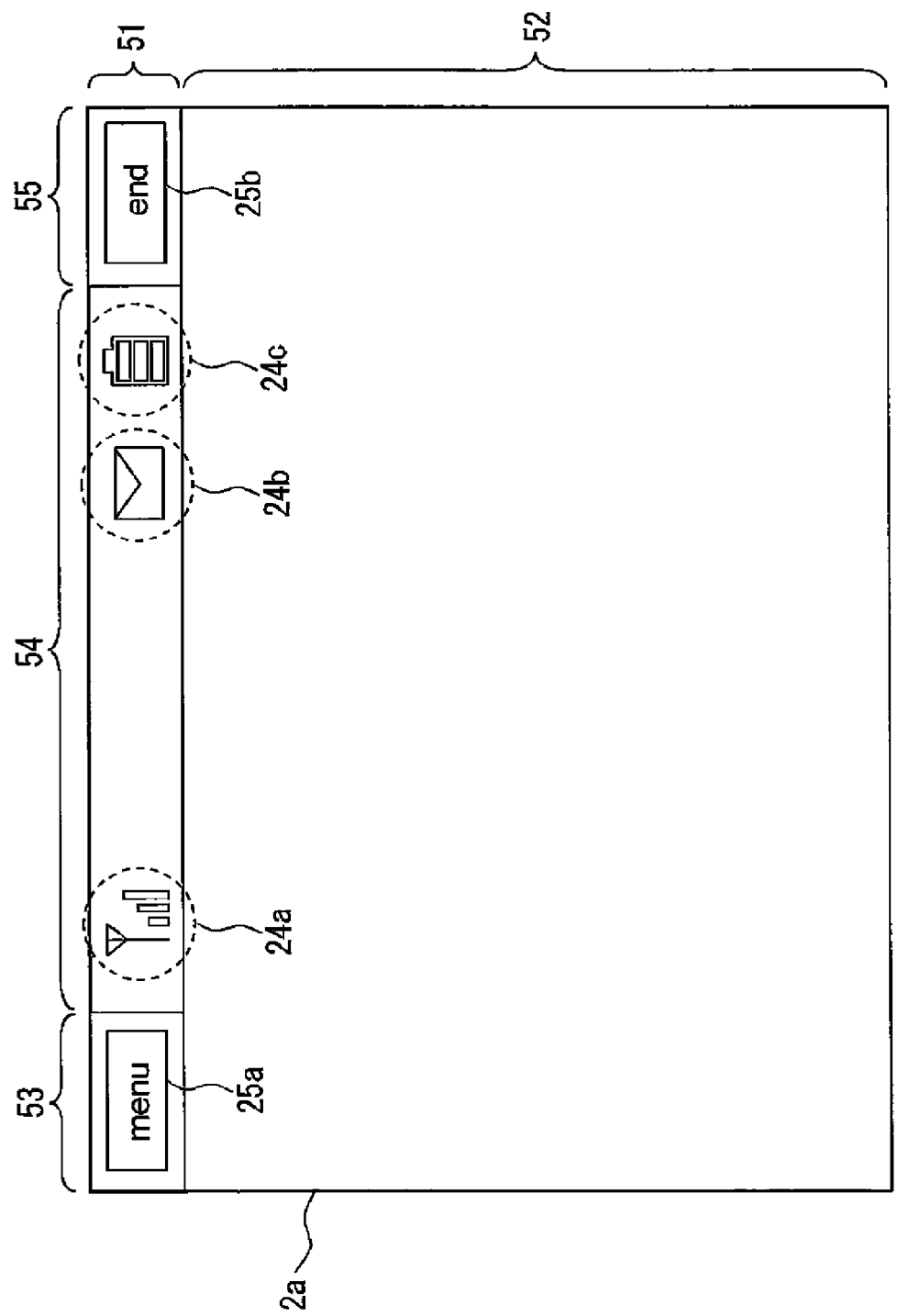

[Fig. 9]
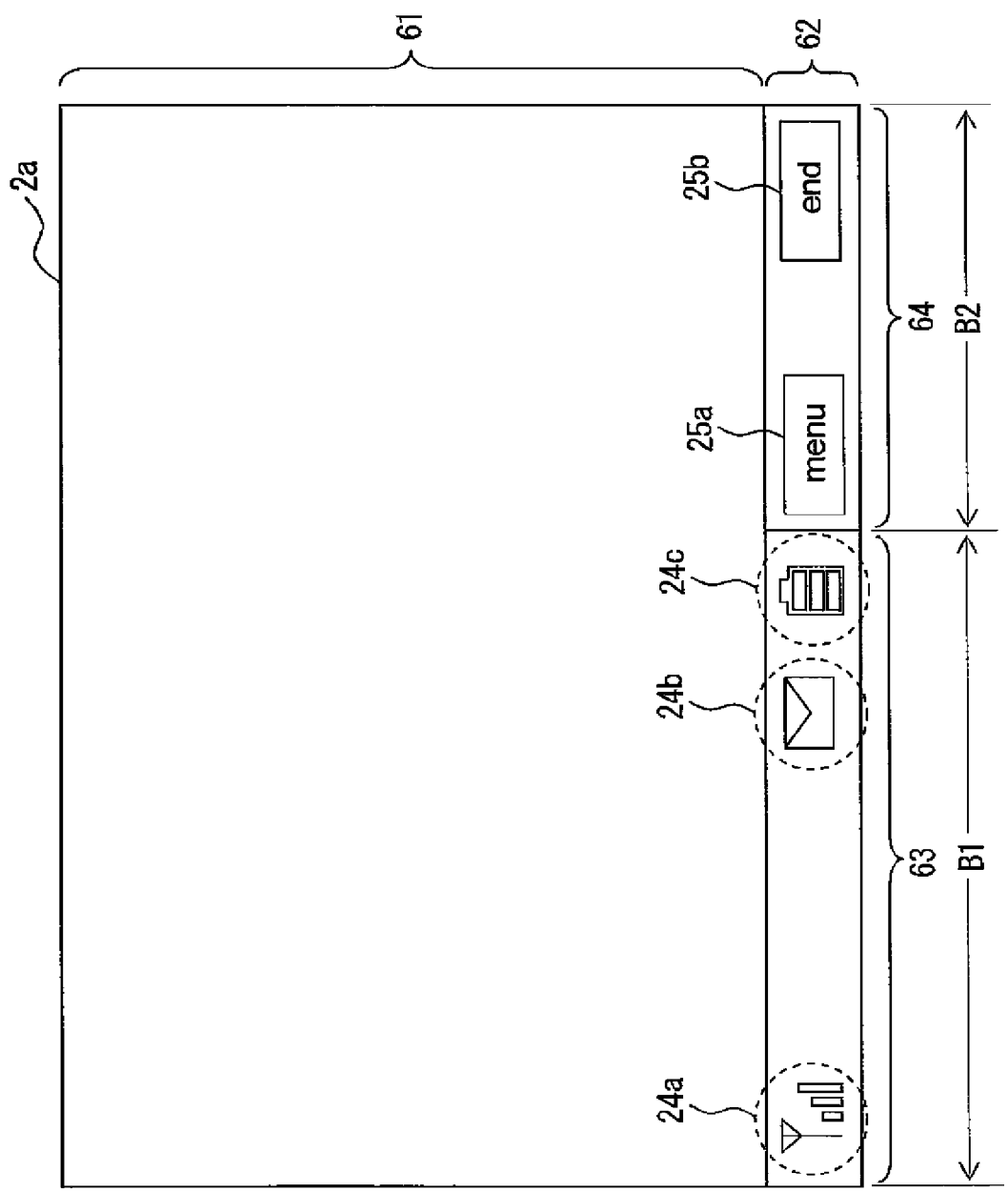

MOBILE COMMUNICATION TERMINAL

TECHNICAL FIELD

The present invention relates to a mobile communication terminal, and more particularly, to improvement of a communication terminal such as a cellular phone of which a display casing is rotatably held with respect to an operation casing such that a display screen can undergo a transition between a vertically long state and a horizontally long state.

BACKGROUND ART

There is known a cellular phone including: a display casing having a display screen; operation casing having operation keys; and connecting means adapted to connect the both casings to each other, wherein the display casing is rotatably held in a plane parallel to the display screen relative to the operation casing.

In such a cellular phone, switching between a vertically long state in which a longer direction of the display screen is made vertical and a horizontally long state in which the longer direction is made horizontal by rotating the display casing can be performed to use the phone.

Patent Document 1: Japanese Unexamined Patent Publication No. 1991-250360
Patent Document 2: Japanese Unexamined Patent Publication No. 1998-26964
Patent Document 3: Japanese Unexamined Patent Publication No. 1998-49334
Patent Document 4: Japanese Unexamined Patent Publication No. 2005-241652

DISCLOSURE OF THE INVENTION

Problems to be Solved by the Invention

In a conventional manner, pictograms indicating a radio wave reception condition and a remaining battery level are displayed in a display area in an upper end portion of the display screen, and icons indicating function assignments assigned to operation keys are displayed in a display area in a lower end portion of the display screen. For this reason, if the display screen undergoes a transition from the vertically long state to the horizontally long state, the above respective display areas are horizontally extended, and therefore there arises a problem that a display area for displaying images and the like is narrowed.

The present invention is made in consideration of the above situation, and an object thereof is to provide a mobile communication terminal of which the display area for displaying images and the like is inhibited from narrowing when a state of the display screen is switched from the vertically long state to the horizontally long state.

Means Adapted to Solve the Problem

A mobile communication terminal according to a first aspect of the present invention is one including: a display casing having a display screen; an operation casing having operation keys; and connecting means adapted to connect the display casing and the operation casing and rotatably hold the display casing with respect to the operation casing such that the display screen can undergo a transition between a vertically long state and a horizontally long state, and configured to include: connecting state detecting means adapted to detect a state of connection by the connecting means and determine whether the display screen is in the vertically long state or the horizontally long state; display object storage means adapted to store first and second display objects to be displayed depending on an operating state; and display controlling means adapted to display the respective display objects on the display screen. On a basis of a result of the determination by the connecting state detecting means, the display controlling means displays, in the case where the display screen is in the vertically long state, two or more of the first display objects in a first object display area provided in an upper end portion of the display screen, and two or more of the second display objects in a second object display area provided in an lower end portion of the display screen, or in the case where the display screen is in the horizontally long state, the respective first and second display objects in a third object display area provided in any of an upper end portion or a lower end portion of the display screen.

In the mobile communication terminal, it is determined whether the display screen is in the vertically long state or the horizontally long state, and on a result of the determination, the respective display objects are displayed on the display screen. At this time, if the display screen is in the horizontally long state, the first and second display objects are displayed in the third object display area provided in any of the upper or lower end portion of the display screen. Based on such configuration, in the horizontally long state of the display screen, the respective display objects are arranged in one and the same object display area, so that the display area for displaying images and the like can be inhibited from narrowing when the state of the display screen is switched from the vertically long state to the horizontally long state.

Note that the display objects herein refer to objects to be displayed, such as characters and images to be displayed on the display screen. Specifically, pictograms indicating a radio wave reception condition and a remaining battery level, icons indicating function assignments assigned to the operation keys, a character string indicating a source, and the like are included in the display objects.

A mobile communication terminal according to a second aspect of the present invention is configured such that, in addition to the above-described configuration, the display controlling means sections the third object display area into first and second divided areas, and displays the respective first display objects in the first divided area including a continuous area having an area width larger than that of the second divided area.

A mobile communication terminal according to a third aspect of the present invention is configured such that, in addition to the above-described configuration, the area width of the first divided area coincides with that of the first object display area.

A mobile communication terminal according to a fourth aspect of present invention is configured such that, in addition to the above-described configuration, a character string displayed in the first object display area as the first display object in the vertically long state is displayed in the first divided area in the horizontally long state. Based on such configuration, the character string as the first display object is displayed in the first divided area including the continuous area having the area width larger than that of the second divided area, and therefore uncomfortable feeling can be inhibited from arising when the state of the display screen is switched from the vertically long state to the horizontally long state during the display of the character string.

A mobile communication terminal according to a fifth aspect of present invention includes, in addition to the above-described configuration, source object generating means adapted to generate a source display object including a character string indicating a source upon incoming or calling, and is configured such that the display controlling means displays the source display object in the first object display area in the vertically long state, or in the first divided area in the horizontally long state.

A mobile communication terminal according to a sixth aspect of the present invention is configured such that, in addition to the above-described configuration, the display controlling means provides a marquee display of the source display object.

A mobile communication terminal according to a seventh aspect of the present invention is configured such that, in addition to the above-described configuration, the display controlling means sections a same row to provide the first and second divided areas.

A mobile communication terminal according to an eighth aspect of the present invention is configured such that, in addition to the above-described configuration, the respective second display objects are icons indicating function assignments respectively assigned to the operation keys, and the display controlling means sections the third object display area into the first and second divided areas; and displays the respective first objects in the first divided area including a continuous area and the respective second display objects in the second divided areas separated left and right so as to sandwich the first divided area. Based on such configuration, the respective second display objects are the icons displayed in the second divided areas separated left and right so as to sandwich the first divided area, and therefore can be easily associated with the left and right operation keys.

A mobile communication terminal according to a ninth aspect of the present invention is configured such that, in addition to the above-described configuration, the display controlling means provides the third object display area in the lower end portion of the display screen.

Effects of the Invention

Based on the mobile communication terminal according to the present invention, in the horizontally long state of the display screen, the respective display objects are arranged in one and the same object display area, and therefore the display area for displaying images and the like can be inhibited from narrowing when the state of the display screen is switched from the vertically long state to the horizontally long state.

BEST MODE FOR CARRYING OUT THE INVENTION

FIG. 1 is a perspective view illustrating an example of a schematic configuration of a mobile communication terminal according to an embodiment of the present invention, in which a foldable cellular phone 1 is illustrated as an example of the mobile communication terminal. The cellular phone 1 includes: a display casing 2 having a display screen 2a; an operation casing 4 having operation keys 4a, and 5a to 5c; and a hinge part 3 for connecting the display casing 2 and the operation casing 4 to each other, and both of the casings can be folded with the display screen 2a and an operating surface of the operation casing 4 being made to face to each other. Note that FIG. 1 illustrates the cellular phone 1 with the both casings being expanded.

The display casing 2 is arranged with the display screen 2a and a receiver 8 on a surface thereof facing to the operating surface of the operation casing 4 in a folded state. The display screen 2a is an output part for characters and images, and formed in a rectangular shape. Here, the display screen 2a is arranged such that a longer direction thereof corresponds to that of the display casing 2. The receiver 8 is a voice output part upon calling, and arranged at an end part on a side opposite to the hinge part 3 in the display casing 2.

The operation casing 4 is arranged with a plurality of operation keys 4a, and 5a to 5c, and a transmitting microphone 7 on a surface thereof facing to the display screen 2a of the display casing 2 in the folded state. The operation keys 4a include ten keys, on-hook key, off-hook key, and the like, and are arranged on a side opposite to the hinge part 3 in the operation casing 4.

The operation keys 5a to 5c are ones for displaying icons indicating function assignments on the display screen 2a, and referred to as guide keys, function keys, soft keys, or the like. The respective operation keys 5a to 5c are arranged on the hinge part 3 side in the operation casing 4.

We here assume that, as such operation keys, a menu key 5a, an end key 5b, and a direction key 5c are provided. The menu key 5a is an operation key for displaying a menu screen, and arranged on the left side of the operation casing 4. The end key 5b is an operation key for quitting a running application program. The direction key 5c is a multi-function key by which input depends on a press-down position, and can vertically and horizontally move a cursor position or the like. The transmitting microphone 7 is a voice input part upon calling, and arranged at an end part on a side opposite to the hinge part 3 in the operation casing 4.

The hinge part 3 includes: a connecting part 3a provided so as to be rotationally movable with respect to the operation casing 4; and a holding part 3b for holding the display casing 2. The connecting part 3a includes two cylindrical bodies formed at one end part of the holding part 3b so as to project at a certain interval between each other. At one end part in a longer direction on an inner surface of the operation casing 4, a cylindrical body 6 is formed so as to extend in a direction perpendicular to the longer direction, and the cylindrical body 6 is coaxially arranged between the respective cylindrical bodies of the connecting part 3a. By rotationally moving the hinge part 3 with respect to the operation casing 4, the terminal can be folded.

The holding part 3b is adapted to rotatably hold the display casing 2 in a plane parallel to the display screen 2a, and the display casing 2 is adapted to rotate with an inclination angle to the operation casing 4 being kept. That is, the hinge part 3 is means adapted to make a connection between the display casing 2 and the operation casing 4, and rotatably hold the display casing 2 with respect to the operation casing 4 such that the display screen 2a can undergo a transition between a vertically long state and a horizontally long state.

Such a folding type cellular phone 1 can be carried with being compactly folded, and when the casings are expanded, the operation keys 4a, and 5a to 5c can be operated while viewing a display on a display screen 2a. Also, the cellular phone 1 is adapted to enable a call in an excellent condition with a mouth being brought close to the transmitting microphone 7 and an ear being brought close to the receiver 8 by bringing the display screen 2a into the vertically long state as illustrated in FIG. 1, and placing the ear against an inner surface of the display casing 2.

FIG. 2 is a perspective view illustrating a state where the display casing 2 in the cellular phone 1 of FIG. 1 is rotated with respect to the operation casing 4, in which a state where the display casing 4 is rotated clockwise from the state illustrated in FIG. 1 by approximately 45 degrees as viewed from the front is illustrates. FIG. 3 is a perspective view illustrating a state where the display casing 2 of the cellular phone 1 in FIG. 1 is rotated, and illustrates the state where the display casing 2 is rotated clockwise from the state illustrated in FIG. 1 by 90 degrees as viewed from the front.

A user can switch between the vertically long state illustrated in FIG. 1 and the horizontally long state illustrated in FIG. 3 by rotating the display casing 2 while grasping the operation casing 4. That is, by rotating the display casing 2 from the vertically long state illustrated in FIG. 1, the user can make the display screen 2a undergo a transition to the horizontally long state as illustrated in FIG. 3 through the state illustrated in FIG. 2.

When the user watches a TV broadcast, he/she can display TV images in accordance with an aspect ratio of the TV images by switching the display screen 2a to the horizontally long state. That is, a ratio between long and short sides of the display screen 2a is 16:9, which corresponds to the aspect ratio of the TV images used for the typical TV broadcast.

In a case where the display casing 2 is rotated clockwise from the state illustrated in FIG. 1, it is adapted such that a biasing force acts on the display casing 2 anticlockwise by biasing means provided inside the holding part 3b of the hinge part 3 until the state illustrated in FIG. 2 is reached. Accordingly, in the state illustrated in FIG. 1, the display casing 2 is adapted to be kept in the state illustrated in FIG. 1 by the biasing force acting on the display casing 2 anticlockwise unless an external force acts.

On the other hand, if the display casing 2 is further rotated clockwise from the state illustrated in FIG. 2, the biasing force acting on the display casing 2 is switched to a clockwise force, and then the display casing 2 is locked in the state illustrated in FIG. 3. Based on this, the display casing 2 is adapted to be kept in the state illustrated in FIG. 3 unless the external force acts.

In the present embodiment, the display casing 2 does not rotate around a rotary axis fixed at a certain position, but is adapted to rotate around a rotary axis moving with the rotation of the display casing 2. Based on this, even if the display casing 2 in the vertically long state in which one end part in the longer direction is close to the operation casing 4 as illustrated in FIG. 1 is rotated by 90 degrees, it is adapted such that one end part in a direction perpendicular to the longer direction of the display casing 2 is brought close to the operation casing 4 as illustrated in FIG. 3, and the TV images can be displayed on the display screen 2a having been compactly brought into the horizontally long state to watch the TV broadcast.

Also, by rotating the display casing 2 from the vertically long state to the horizontally long state while grasping the operation casing 4, the TV broadcast can be watched without shifting the cellular phone 1 from one hand to the other. At this time, the display casing 2 is adapted to be able to be smoothly switched between the vertically long state and the horizontally long state by the biasing force acting on the display casing 2.

FIG. 4 is a block diagram illustrating an example of a functional configuration inside the cellular phone 1 of FIG. 1. The cellular phone 1 includes antennas 11a and 12a, a cellular communication part 11, a TV broadcast receiving part 12, an operation input part 13, a speaker 14, a display controlling part 16, an LCD 17, a connecting state detecting part 18, a source object generating part 19, and a display object storage part 20, in addition to the above-described receiver 8 and transmitting microphone 7, and operations of them are controlled by a main control part 15 including a processor.

The speaker 14 is a voice output part, and can amplify voice to output it louder than a case where it is outputted from the receiver 8. This enables the voice to be heard even with the ear being apart from the display casing 2.

The receiver 8 is used with the user placing the user's ear against an inner surface of the display casing 2, whereas the speaker 14 is used with the user setting the user's ear apart from the inner surface of the display casing 2. Accordingly, the display of TV images and the like on the display screen 2a can be viewed while the speaker 14 is used, but cannot be viewed while the receiver 8 is used.

When the speaker 14 is used to make a call with an opposite side telephone set, voice from the opposite side telephone set is amplified and then outputted from the speaker 14, and an input signal from the transmitting microphone 7 is amplified, whereby a hands-free call can be made without grasping the cellular phone 1. At this time, the input signal from the transmitting microphone 7 is adapted to be inputted to a cancel circuit for preventing howling. Switching between the normal call using the receiver 8 and the hands-free call can be performed by operating the operation keys.

The cellular communication part 11 is mobile communication processing means adapted to transmit/receive a radio wave to/from a base station via the antenna 11a for communication. In a state where the call with the opposite side telephone set is established, a voice signal based on call voice of the user is transmitted from the cellular communication part 11, and a voice signal based on call voice from the opposite side telephone set is received by the cellular communication part 11, whereby the two types of call voice are transmitted and received in real time, respectively.

The TV broadcast receiving part 12 is a tuner for receiving TV broadcast waves transmitted from a TV station via the antenna 12a for TV broadcast reception. The TV broadcast waves transmitted from the TV station include an analog broadcast wave corresponding to an analog broadcast and a digital broadcast wave corresponding to a digital broadcast. The digital broadcast wave received by the TV broadcast receiving part 12 is a one-segment broadcast wave for cellular phones, which is allocated to a certain band for a general digital high-vision broadcast wave, and includes, in addition to TV images and TV voice, character information such as captions corresponding to the TV images and associated articles, channel information depending on a frequency band for the incoming radio wave.

On a basis of the TV broadcast wave received by the TV broadcast receiving part 12, the TV images are displayed on the display screen 2a, and various types of TV voice corresponding to the TV images are outputted from the speaker 14, whereby the TV broadcast can be watched. Also, by extracting the character information included in the TV broadcast wave to display it on the display screen 2a, the character information such as the captions can be displayed together with the TV images. Further, if the TV images and the various types of TV voice based on the TV broadcast wave are stored in a memory (not shown), the TV broadcast can be recorded.

The operation input part 13 performs operations for generating input signals on the basis of operations of the respective operation keys 4a, and 5a to 5c. The connecting state detecting part 18 performs operations for detecting a state of connection by the hinge part 3 to determine whether the display screen 2a is in the vertically long state or the horizontally long state. Specifically, it includes a mechanical or electrical switch, and detects a rotating operation for a display casing 2 by the user to thereby sense a rotational position of the display casing 2.

The display object storage part 20 is a nonvolatile memory, in which first and second display objects to be displayed depending on an operating state are stored. Specifically, pictograms and the like indicating a radio wave reception condition (reception intensity), a remaining battery level, and an incoming mail are stored as the first display objects, and icons and the like indicating the function assignments assigned to the operation keys 5*a* to 5*c* are stored as the second display objects.

The above pictograms are not affected by a screen display based on the other application program, but are display objects constantly displayed on the display screen 2*a*. As the above icons, a menu icon associated with the menu key 5*a*, and an end icon associated with the end key 5*b* are stored as the display objects.

The source object generating part 19 performs operations for generating source display objects each including a character string indicating a source upon incoming or calling. Specifically, source phone numbers, pre-registered user names, and the like are generated as the display objects indicating the sources.

The LCD (Liquid Crystal Display) 17 is a display device having the display screen 2*a*. The display controlling part 16 performs operations for controlling the LCD 17 to display characters and images on the display screen 2*a*. Specifically, the respective display objects are displayed on the display screen 2*a* on the basis of a result of the determination by the connecting state detecting part 18. That is, if the display screen 2*a* is in the vertically long state, a plurality of first display objects are displayed in a first object display area provided in an upper end portion of the display screen 2*a*, and a plurality of second display objects are displayed in a second object display area provided in a lower end portion of the display screen 2*a*. On the other hand, if the display screen 2*a* is in the horizontally long state, the respective first and second display objects are displayed in a third object display area provided in a lower end portion of the display screen 2*a*.

We here assume that the third object display area is sectioned into first and second divided areas, and the respective first display objects are displayed in the first divided area including a continuous area having an area width larger than that of the second divided area. We also assume that a character string displayed in the first object display area as the first display object in the vertically long state is displayed in the first divided area in the horizontally long state.

FIGS. 5 (*a*) and (*b*) are diagrams illustrating an example of operations in the cellular phone 1 of FIG. 1, and in FIG. 5 (*a*), an appearance of the display screen 2*a* in the vertically long state is illustrated, whereas, in FIG. 5 (*b*), an appearance of the display screen 2*a* in the horizontally long state is illustrated. In the vertically long state, a display area is vertically extended as compared with horizontally, as viewed from the user. In such a vertically long state, the first object display area 21 is provided in the upper end portion of the display screen 2*a*, and a second object display area 23 is provided in the lower end portion.

An area between the first object display area 21 and the second object display area 23 is a display area 22 for images and the like.

We here assume that the first object display area 21 is provided such that a height of a row for displaying a character string coincides with that of the area, and arranged adjacent to a short side of the display screen 2*a*. In this example, the pictograms 24*a* to 24*c* are displayed in the first object display area 21, and the icons 25*a* and 25*b* are displayed in the second object display area 23.

The pictogram 24*a* is a display object for indicating a radio wave reception intensity, and arranged at a left end part. The pictogram 24*b* is a display object for indicating the incoming of an electronic mail. The pictogram 24*c* is a display object for indicating the remaining battery level, and arranged at a right end part.

The icon 25*a* is the menu icon, and a symbol like an operation button is displayed as the menu icon. The icon 25*a* is arranged at the left end part. The icon 25*b* is the end icon, and a symbol like an operation button is displayed as the end icon. The icon 25*b* is arranged at the right end part.

On the other hand, in the horizontally long state, the display area is horizontally extended as compared with vertically, as viewed from the user. In such a horizontally long state, the third object display area 32 is provided in the lower end portion of the display screen 2*a*. An area other than the third object display area 32 is a display area 31 for images and the like.

We here assume that the third object display area 32 is provided such that a height of a row for displaying a character string coincides with that of the area, and arranged adjacent to the long side of the display screen 2*a*. The third object display area 32 is sectioned into the first divided area 34 and the second divided areas 33 and 35, and the respective first display objects are displayed in the first divided area 34 including the continuous area having an area width A3 larger than those of the second divided areas 33 and 35. That is, a ratio of change of the first divided area 34 to the object display area in the vertically long state (area width: A1) is small, as compared with that of the second divided areas 33 and 35 (area width: A2+A4).

We here assume that the respective display areas 33 to 35 are provided by sectioning the same row. That is, assumed is that heights of the icons 25*a* and 25*b*, pictograms 24*a* to 24*c*, and character strings are aligned to display the respective display objects.

The first display objects 24*a* to 24*c* are displayed in the first divided area 34 in a same order as that in the vertically long state. This enables the first display objects to be recognized without uncomfortable feeling when the state of the display screen 2*a* is switched from the vertically long state to the horizontally long state, because an arrangement order of the respective pictograms 24*a* to 24*c* is unchanged before and after the state transition.

The second display objects 25*a* and 25*b* are respectively displayed in the second divided areas 33 and 35. That is, the two icons 25*a* and 25*b* corresponding to the respective operation keys 5*a* and 5*b* arranged left and right are displayed in the display area 33 on the left side and the display area 35 on the right side, respectively. Specifically, the icon 25*a* is arranged on the left side, and the icon 25*b* on the right side.

In this example, the area width A3 of the first divided area 34 coincides with the area width A1 of the first object display area 21. That is, the first divided area 34 is formed such that the horizontal length thereof is not different from those of the respective object display areas 21 and 23 in the vertically long state. Configuring in this manner can inhibit the uncomfortable feeling from arising when the state of the display screen 2*a* is switched from the vertically long state to the horizontally long state, because the display area for the pictograms 24*a* to 24*c* just goes down from the first object display area 21 to the third object display area 32 without modification. Note that the area width A3 of the first divided area 34 may be made larger than the area width A1.

Also, by providing the third object display area 32 in the lower end portion of the display screen 2*a*, operability can be improved even in the horizontally long state, similarly to the vertically long state, because the positions of the second display objects are close to the respective operation keys 5*a* to 5*c* on the operation casing 4. In particular, by respectively arranging the icons 25a and 25b in the display area 33 on the left side and the display area 35 on the right side, the uncomfortable feeling can be inhibited from arising when the state of the display screen 2a is switched from the vertically long state to the horizontally long state.

FIG. 6 is a diagram illustrating an example of the operations in the cellular phone 1 of FIG. 1, and illustrates an appearance of the display screen 2a upon incoming or calling. In the case where the display screen 2a is in the horizontally long state, the source display object 41 including a character string indicating a source is displayed in the third object display area 32 upon incoming or calling.

Specifically, a source phone number or a user name is displayed in the first divided area 34 as the source display object 41. The source display object 41 is statically or dynamically displayed in the horizontal direction as a direction of the character string. The static display includes a so-called ticker display in which a character string having a certain number of characters as an upper limit is displayed in a given display area. The dynamic display includes a so-called marquee display in which a character string is displayed as if it flows in one direction from one end to the other end in a given display area while varying a display position of the characters.

Steps S101 to S105 in FIG. 7 represent a flowchart illustrating an example of the operations in the cellular phone 1 of FIG. 1. First, the connecting state detecting part 18 detects a connecting state of the hinge part 3 (Step S101). Then, the display controlling part 16 changes arrangement of the first and second display objects if the state of the display screen 2a is switched from the vertically long state to the horizontally long state (Steps S102 and S103). At this time, the pictograms 24a to 24c and icons 25a and 25b are arranged in the third object display area 32.

On the other hand, if the state of the display screen 2a is switched from the horizontally long state to the vertically long state, the arrangement of the first and second display objects is changed (Steps S104 and S105). At this time, the pictograms 24a to 24c are arranged in the first object display area 21, and the icons 25a and 25b are arranged in the second object display area 23.

According to the present embodiment, in the horizontally long state of the display screen 2a, the respective display objects are arranged in one and the same object display area 32, so that the display area 31 for displaying images and the like can be inhibited from narrowing when the state of the display screen 2a is switched from the vertically long state to the horizontally long state.

Note that, in the present embodiment, the case where the third object display area is provided in the lower end portion of the display screen 2a is described as an example; however, the present invention is not limited to this. For example, the third object display area may be provided in an upper end portion of the display screen 2a.

FIG. 8 is a diagram illustrating another embodiment of the present invention, in which an appearance of the display screen 2a in the horizontally long state is illustrated. In this example, a third object display area 51 is provided in the upper end portion of the display screen 2a. An area other than the third object display area 51 is a display area 52 for images and the like.

Also, the third object display area 51 is sectioned into a first divided area 54, and second divided areas 53 and 55, and in the respective display areas 53 to 55, the respective display objects are arranged. Even by such a configuration, the display area 52 for displaying images and the like can be inhibited from narrowing when the state of the display screen 2a is switched from the vertically long state to the horizontally long state, because the respective display objects are arranged in one and the same object display area 51 in the horizontally long state of the display screen 2a.

Note that, in the present embodiment, the case where the respective second display objects are displayed in the second divided areas 33 and 35 separated left and right respectively so as to sandwich the first divided area 34 is described as an example; however, the present invention is not limited to this. For example, the third object display area may be sectioned into two continuous areas to display the first display objects in one of the continuous areas as the first divided area, and the second display objects in the other one of the continuous areas as the second divided area.

FIG. 9 is a diagram illustrating still another embodiment of the present invention, in which an appearance of the display screen 2a in the horizontally long state is illustrated. In this example, a third object display area 62 is sectioned into two continuous areas, i.e., a display area 63 on the left side and a display area 64 on the right side, and the respective display objects are arranged in the respective display areas. A display area 61 is one for images and the like.

Specifically, the pictograms 24a to 24c are arranged in the display area 63 on the left side, and the icons 25a and 25b are arranged in the display area 64 on the right side. The display area 63 on the left side is adapted to be the first divided area, and the display area 64 on the right side to be the second divided area. The display area 63 on the left side includes an area of which an area width B1 is larger than an area width B2 of the display area 64 on the right side, and in the area, the respective first display objects are displayed. That is, a ratio of change of the display area 63 on the left side to the object display area (area width A1) in the vertically long state is small, as compared with that of the display area 64 on the right side. Even by such a configuration, the display area 61 for displaying images and the like can be inhibited from narrowing when the state of the display screen 2a is switched from the vertically long state to the horizontally long state, because the respective display objects are arranged in one and the same object display area 62 in the horizontally long state of the display screen 2a.

The present application claims the Paris convention priority of the patent application filed on Mar. 28, 2006, in Japan (Japanese Patent Application No. 2006-87357), which is incorporated herein by reference in its entirety.

BRIEF DESCRIPTION OF THE DRAWINGS

FIG. 1 is a perspective view illustrating an example of a schematic configuration of a mobile communication terminal according to an embodiment of the present invention, in which a foldable cellular phone 1 is illustrated as an example of the mobile communication terminal.

FIG. 2 is a perspective view illustrating a state where the display casing 2 in the cellular phone 1 of FIG. 1 is rotated with respect to the operation casing 4.

FIG. 3 is a perspective view illustrating a state where the display casing 2 of the cellular phone 1 in FIG. 1 is rotated, in which the state where the display casing 4 is rotated clockwise from the state illustrated in FIG. 1 by 90 degrees as viewed from the front is illustrated.

FIG. 4 is a block diagram illustrating an example of a functional configuration inside the cellular phone 1 of FIG. 1.

FIG. 5 is a diagram illustrating an example of operations in the cellular phone 1 of FIG. 1.

FIG. 6 is a diagram illustrating an example of the operations in the cellular phone 1 of FIG. 1, in which an appearance of the display screen 2*a* upon incoming or calling is illustrated.

FIG. 7 is a flowchart illustrating an example of the operations in the cellular phone 1 of FIG. 1.

FIG. 8 is a diagram illustrating another embodiment of the present invention, in which an appearance of the display screen 2*a* in a horizontally long state is illustrated.

FIG. 9 is a diagram illustrating still another embodiment of the present invention, in which an appearance of the display screen 2*a* in the horizontally long state is illustrated.

DESCRIPTION OF REFERENCE NUMERALS

1 Cellular phone
2 Display casing
2*a* Display screen
3 Hinge part
3*a* Connecting part
3*b* Holding part
4*a*, 5*a*~5*c* Operation keys
4 Operation casing
7 Transmitting microphone
8 Receiver
11 Cellular communication part
12 TV broadcast receiving part
13 Operation input part
14 Speaker
15 Main control part
16 Display controlling part
17 LCD
18 Connecting state detecting part
19 Source object generating part
20 Display object storage part

The invention claimed is:

1. A mobile communication terminal including: a display casing having a display screen; an operation casing having two or more operation keys; and a connecting part adapted to connect said display casing and said operation casing and rotatably hold said display casing with respect to said operation casing such that said display screen can undergo a transition between a vertically long state and a horizontally long state, the mobile communication terminal comprising:

a connecting state detecting part adapted to detect a state of connection by said connecting part and determine whether said display screen is in the vertically long state or the horizontally long state;

a display object storage part adapted to store pictograms and icons to be displayed depending on an operating state; and a display controlling part adapted to display said pictograms and said icons on said display screen, wherein, on a basis of a result of the determination by said connecting state detecting part, said display controlling part displays, in the case where said display screen is in the vertically long state, two or more of said pictograms in a first object display area provided in an upper end portion of the display screen, and two or more of said icons in a second object display area provided in an lower end portion of the display screen, and in the case where said display screen is in the horizontally long state, said pictograms and said icons in a third object display area provided in any of an upper end portion or a lower end portion of the display screen, and said icons indicate function assignments respectively assigned to said operation keys that are different each other, and said display controlling part sections said third object display area into first and second divided areas, and displays said pictograms in said first divided area including a continuous area and said icons in said second divided areas separated left and right so as to sandwich said first divided area.

2. The mobile communication terminal according to claim 1, wherein said first divided area has an area width larger than that of said second divided area, and said area width of said first divided area coincides with an area width of said first object display area.

3. The mobile communication terminal according to claim 2, wherein a character string displayed in said first object display area as said pictograms in said vertically long state is displayed in said first divided area in said horizontally long state.

4. The mobile communication terminal according to claim 2, comprising a source object generating part adapted to generate a source display object including a character string indicating a source upon incoming or calling, wherein said display controlling part displays said source display object in said first object display area in said vertically long state, or in said first divided area in said horizontally long state.

5. The mobile communication terminal according to claim 4, wherein said display controlling part provides a marquee display of said source display object.

6. The mobile communication terminal according to claim 1, wherein said display controlling part provides said third object display area in the lower end portion of the display screen.

7. The mobile communication terminal according to claim 1, wherein said icon arranged on a left side in said second object display area, and said icon arranged in said left side second divided area are related to each other by same one of said operation keys, and said icon arranged on a right side in said second object display area, and said icon arranged in said right side second divided area are related to each other by same one of said operation keys.

8. The mobile communication terminal according to claim 7, wherein said display controlling part sections a same row to provide said first and second divided areas.

* * * * *